Sept. 30, 1941.　　　A. L. NELSON　　　2,257,184
PISTON
Filed May 7, 1936　　　2 Sheets-Sheet 1
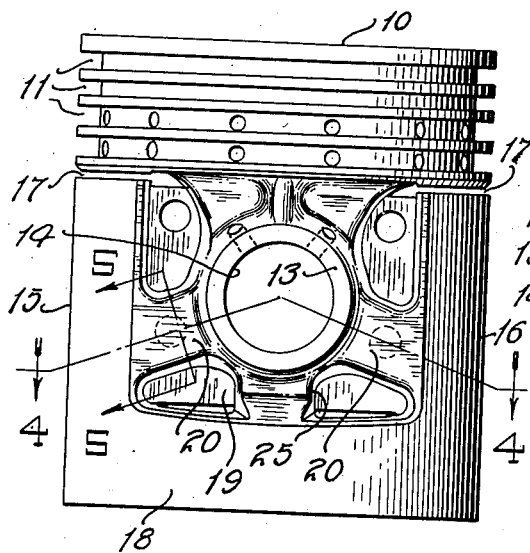
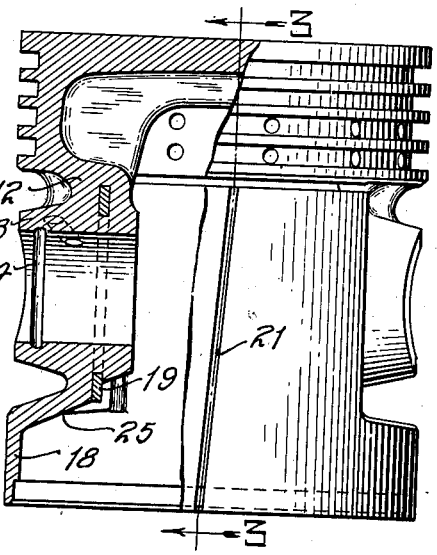
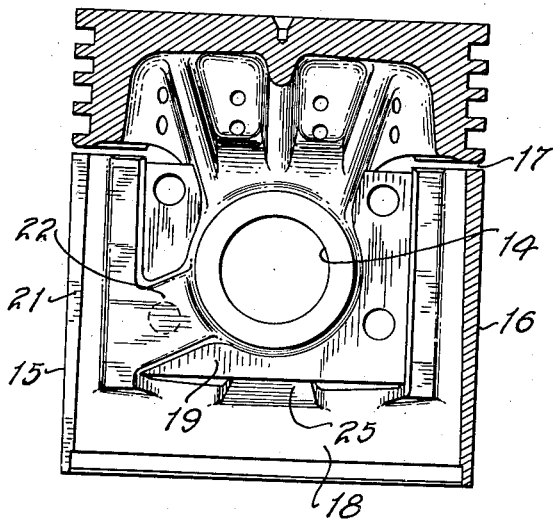
INVENTOR.
Adolph L. Nelson
BY Ramsey, Kent, Chisholm and Lutz
ATTORNEYS Sept. 30, 1941.    A. L. NELSON    2,257,184
PISTON
Filed May 7, 1936    2 Sheets-Sheet 2
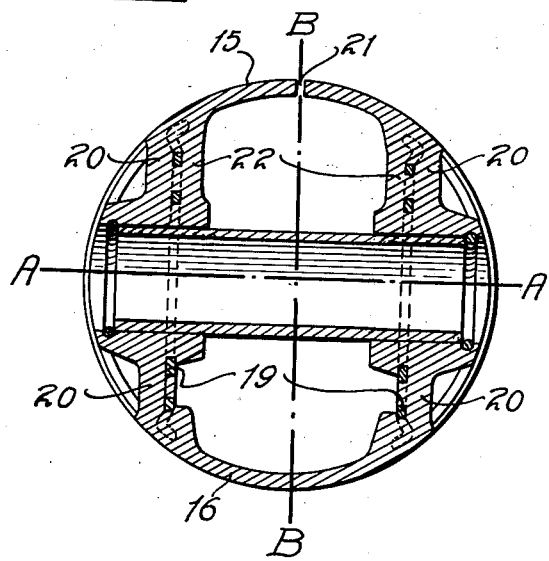
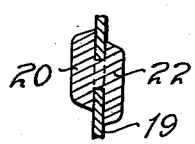
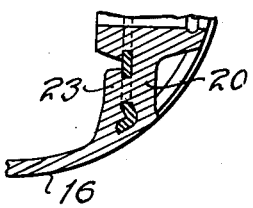
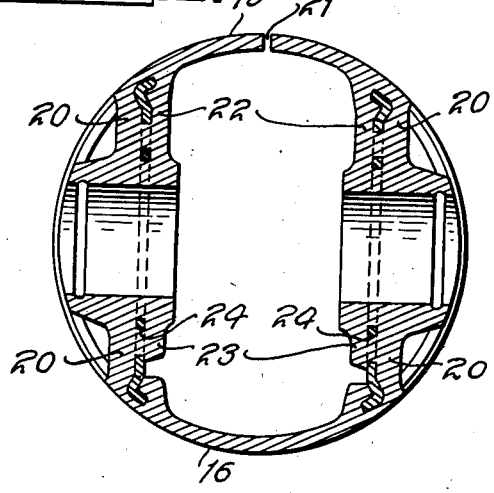
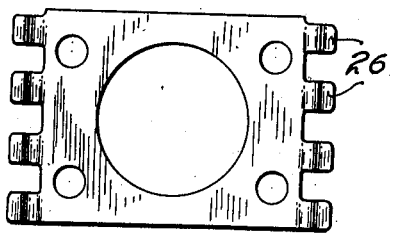
INVENTOR.
Adolph L. Nelson
BY Ramsey, Kent, Chisholm and Lutz
ATTORNEYS.

Patented Sept. 30, 1941

2,257,184

UNITED STATES PATENT OFFICE 2,257,184

PISTON

Adolph L. Nelson, Detroit, Mich., assignor to Bohn Aluminum & Brass Corporation, Detroit, Mich., a corporation of Michigan Application May 7, 1936, Serial No. 78,346

10 Claims. (Cl. 309—14)

This invention relates to an improved piston for internal combustion engines.

It is particularly concerned with the provision of a piston formed of a light-weight material, such as an alloy of aluminum. Materials of this kind have higher rates of thermal expansion than the material of the engine cylinders, which are usually made of cast iron, and the present invention provides means to compensate for this excess expansion of the light-weight piston.

My co-pending application Serial No. 735,917, filed July 19, 1934, which has matured into Patent No. 2,086,677, discloses a piston the skirt of which has an oval exterior shape when cold and which includes thermostatic elements arranged to bend the skirt toward substantially cylindrical shape under an increase in temperature, thus compensating for excess expansion of the skirt material.

The present invention relates to changes of the structure illustrated in Patent No. 2,086,677 by the provision of a slot extending vertically in the skirt and by the addition of modifying elements, these changes permitting the piston of the invention to give improved performance under certain conditions.

These and other objects and advantages of the invention will become apparent as the description proceeds.

While preferred forms of the invention are disclosed herein for purposes of illustration, it should be understood that various changes may be made in the structure without departing from the spirit of the invention as hereinafter set forth and claimed.

In the drawings:

Fig. 1 is a side elevation of a piston embodying the invention.

Fig. 2 is an elevation partly in section looking at the piston from the left of Fig. 1.

Fig. 3 is a section on line 3—3 of Fig. 2.

Fig. 4 is a section on line 4—4 of Fig. 1, but showing the wrist pin in place.

Fig. 5 is a section on line 5—5 of Fig. 1.

Fig. 6 is a view corresponding to Fig. 4, but showing a modification.

Fig. 7 is a fragmentary section showing a further modification.

Fig. 8 is an elevation of a strut.

The piston comprises in general a head 10 having piston ring grooves 11 formed therein. The head is made enough smaller than the bore of the cylinder to prevent contact of the head with the bore at any temperature, and the gap between the head and the cylinder is sealed by piston rings in the well-known manner.

Piers 12 depend from the head and carry piston pin bosses 13 formed with openings 14 into which a piston pin is fitted (Fig. 4). The skirt of the piston includes opposite thrust faces 15 and 16 having their upper ends separated from the head by slots 17 and their lower ends connected by arcuate parts 18.

All of the parts thus far described are preferably formed of some light-weight material having a high rate of thermal conductivity, such as an alloy of aluminum.

The thrust faces 15 and 16 carry the main loads against the cylinder wall resulting from the angularity of the connecting rod, and therefore the diameter B—B passing through these faces (Fig. 4) is the important diameter that must have a proper fit in the cylinder bore at all temperatures encountered. The diameter, B—B, is referred to herein as the "thrust diameter."

The first essential of this invention is that the skirt be given an oval exterior shape by any suitable method, preferably by grinding, the oval being disposed with its minor axis, A—A (Fig. 4) coinciding with the axis of the piston pin bosses, and with its major axis B—B at right angles to the axis of the pin bosses.

The oval is preferably produced by cam-grinding the skirt so as to give it a uniform oval from top to bottom.

The finished skirt is given such a size that when the piston is at approximately 70° F. the diameter B—B has a close working fit in the cylinder bore and the diameter A—A h*s an excess clearance. Means are incorporated in the piston structure that will, under an increase of piston temperature, bend the skirt toward cylindrical shape, thereby increasing the diameter A—A, while pulling inwardly on the diameter B—B and preventing this diameter from acquiring too close a clearance in the cylinder bore.

The bending means used is a pair of bi-metallic thermostatic elements extending across the piston. Each of the thermostatic elements comprises an inner plate member 19 which is formed of material, such as steel, having a lower coefficient of thermal expansion than the skirt material, and an outer member formed of the skirt material. In the form shown the outer member 20 includes part of the pin boss and the ties extending from the pin boss to each of the thrust faces. The members 19 and 20 may be called the primary members of the thermostatic elements.

Because of the fact that these thermostatic elements have the more highly expansible material on the outside, the middle part of each thermostatic element will bend outwardly under an increase of temperature, as the engine warms up in operation, spreading the pin bosses and bending the skirt from oval toward cylindrical form, thus preventing excessive expansion of the diameter B—B, and maintaining a proper working clearance between the thrust faces and the cylinder walls.

When the engine is stopped, the pistons cool off; the thermostatic elements return to their original shape; and the pin bosses move toward each other, thus maintaining diameter B—B at its proper working clearance and preventing piston slap when the cold motor is next started.

The above-described action of the thermostatic elements in bending the skirt so as to maintain proper working fit at the ends of diameter B—B, can take place properly only when the piston pin bosses have a free, sliding fit on the piston pin at all temperatures encountered in automobile operation. If the pin bosses become tight on the pin at any time they interfere with the thermostatic control of the skirt, as will now be explained.

The piston pin is usually a steel member of tubular shape, as illustrated in Fig. 4, and the pin bosses, being of aluminum, have a faster rate of expansion and contraction under the action of heat than the steel pin. The preferred general practice followed in inserting piston pins in the pin bosses results in the pin having a tight fit in the pin bosses at approximately 70° F. or below, but a close sliding fit at engine operating temperatures. If the above-described piston construction, which is illustrated in Patent No. 2,086,677, is used with this type of pin fitting, as the piston gets hot the bosses are free to move apart to permit the skirt-bending above described. As the piston cools down after the motor is stopped, however, the bosses shrink onto the pin in positions spaced farther from each other than they were before the pin was inserted, thus holding the bosses farther apart than they were in their normal positions when the piston was fitted in the cylinder, which is done before the insertion of the pin.

After this occurs further bending of the thermostatic elements as they cool will serve to move their outer ends apart, thus pulling in the diameter B—B and giving it a looser fit in the cylinder when cold than it had originally. The result would be piston slap when the motor is next started.

To avoid this result, and to maintain a close fit at the ends of diameter B—B over the entire range of engine temperatures regardless of the pin fit the present invention provides a slot, such as slot 21, extending vertically in the thrust face 15. The presence of a vertical slot in a thrust face permits the skirt to maintain a close, non-slapping fit as the piston cools down, in a manner subsequently described, but it also permits the skirt to respond more readily to the bending action of the thermostatic elements, and hence would if used by itself usually produce too much clearance at the ends of diameter B—B when the motor is hot. One means of reducing the curving action of the thermostatic elements is to add modifying elements on the inner sides of the thermostatic elements.

These modifying elements are shown in the piston of Figs. 1 to 4 as ties 22, each tie 22 extending from a pin boss to the thrust face 15. The ties 22 are of smaller cross-sectional area than the outer ties 20, as shown in Fig. 5, and hence the ties 22 do not prevent the bending movement of the thermostatic elements, but merely decrease the amount of bending that can take place.

When the piston of Figs. 1 to 4 is subjected to an increase of temperature the diameter B—B is pulled in much less than it would be if the slot 21 and modifying members were absent, and the piston therefore maintains a closer fit in the cylinder bore. When thereafter the piston cools down and the thermostatic elements tend to return to their cold shape, if their middle parts cannot move farther toward each other because the bosses have frozen to the piston pin before reaching their original positions, their outer ends will tend to move apart. This action will open up the slot 21, making it wider, and tending to maintain the skirt at full size adjacent diameter B—B when cold. On the unslotted thrust face 16 the spreading of the outer ends of the thermostatic elements has a tendency to pull in the part of the thrust face at the end of diameter B—B, but this action is approximately compensated for by the expanding of slot 21 in thrust face 15. The total result is that the diameter B—B is maintained at a proper working fit in the cylinder bore, and there is no piston slap when the motor is next started.

While the action of the slot 21 in preventing "cold-slap" has been explained in connection with a piston in which the pin bosses "freeze" to the pin at a temperature somewhat above 70° F., it will readily be understood that the slot would act similarly if the pin bosses of a particular motor tend to "freeze" to the pin at a temperature below 70° F.

If it is desired to further reduce the amount of thermostatic action, short modifying elements 23 (Fig. 6) may be formed along the inner sides of the plates 19, each element 23 extending partway between a pin boss and a thrust face and passing through a hole 24 formed in plate 19 to join the outer tie 20. In Fig. 6 these short elements 23 extend from the bosses, but as shown in Fig. 7 they may extend from the thrust face instead.

Modifications in the action of the bi-metallic thermostatic elements may be made by using the short modifying element 23 in place of the elements 22 of Fig. 4, or by using the short elements 23 between each thrust face and the bosses.

In the form illustrated the slot 21 is shown as extending entirely through thrust face 15. If less holding out of diameter B—B is needed when the piston is cold the slot may extend only partway through thrust face 15, beginning either at the upper or lower end of the skirt.

The piston structure may be reinforced by a tie 25 extending downwardly and outwardly from each pin boss to the adjacent arcuate part 18. The ties 20 and 22 in addition to serving their function as part of the thermostatic elements cooperate with the ties 24 to attach the piston skirt to the pin bosses, forming a solid, one-piece piston structure that does not depend on the plates 19 to hold the parts together.

Each plate 19 is preferably formed, as shown in Figs. 4 and 7, with a plurality of fingers 26. Each finger is given two bends, the first bend being away from the axis B—B and the second bend being toward it. The plates are placed in the mold before the piston is cast, and during the molding operation the piston metal flows around the plates to form the piston shown.

By giving the finger this double bend it can be anchored with less skirt material than where only a single bend is used, and the center of the cast-in joint is brought into line with the main body of the plate.

I claim:

1. In a piston of the type formed of a light-weight piston material and having piston pin bosses, a piston pin of material having a lower coefficient of expansion than the piston material passing through the pin bosses and having a tight fit in the bosses at 70° F., a skirt having opposite thrust faces, the outer surface of the skirt being at 70° F. of oval shape with the major axis of the oval coinciding with the thrust diameter, the piston being adapted to operate in a cast-iron cylinder bore, the improvement which comprises in combination with the above; a pair of bimetallic elements extending chordally of the piston at right angles to the axis of the piston pin, each bimetallic element comprising an inner primary member of material less expansible than the skirt material extending from one thrust face to the other, and an outer primary member of the skirt material, the bimetallic elements acting to bend the thrust faces toward cylindrical shape upon an increase of temperature, one of the thrust faces being formed with a vertical slot, the parts being so disposed that when upon cooling from an elevated temperature the pin bosses seize on the piston pin further cooling causes the bimetallic elements to move the parts of the skirt adjacent the slot outwardly on the thrust diameter thus keeping the thrust diameter at a close non-slapping fit in the cylinder bore.

2. A piston as claimed in claim 1 in which the vertical slot extends partway downwardly from the upper edge of the skirt.

3. A piston as claimed in claim 1 in which the vertical slot extends partway upwardly from the lower edge of the skirt.

4. A piston as claimed in claim 1 in which the vertical slot extends entirely through the thrust face from the top to the bottom thereof.

5. A piston as claimed in claim 1 which has two modifying members of the piston material, each of the modifying members located between a pin boss and the slotted thrust face and projecting inwardly from the plane of the inner primary member of a bimetallic element toward the thrust diameter, and serving to reduce the bending action of the bimetallic element.

6. In a piston of the type formed of aluminum alloy and having piston pin bosses, a steel piston pin passing through the pin bosses and having a tight fit in the bosses at 70° F., a skirt having opposite thrust faces separated from the piston head by horizontal slots, the outer surface of the skirt being at 70° F. of oval shape with the major axis of the oval coinciding with the thrust diameter, the piston being adapted to operate in a cast-iron cylinder bore, the improvement which comprises in combination with the above; a pair of bimetallic elements extending chordally of the piston at right angles to the axis of the piston pin, each bimetallic element comprising an inner primary steel member extending from one thrust face to the other and an outer primary aluminum member, the bimetallic elements acting to bend the thrust faces toward cylindrical shape upon an increase of temperature, one of the thrust faces being formed with a vertical slot, the parts being so disposed that when upon cooling from an elevated temperature the pin bosses seize on the piston pin further cooling causes the bimetallic elements to move the parts of the skirt adjacent the slot outwardly on the thrust diameter thus keeping the thrust diameter at a close non-slapping fit in the cylinder bore.

7. In a piston of the type formed of aluminum alloy and having piston pin bosses, a steel piston pin passing through the pin bosses and having a tight fit in the bosses at 70° F., a skirt having opposite thrust faces separated from the piston head by horizontal slots, the outer surface of the skirt being at 70° F. of oval shape with the major axis of the oval coinciding with the thrust diameter, the piston being adapted to operate in a cast-iron cylinder bore, the improvement which comprises in combination with the above; a pair of bimetallic elements extending chordally of the piston at right angles to the axis of the piston pin, each bimetallic element comprising an inner primary steel member extending from one thrust face to the other and an outer primary aluminum member, the inner surfaces of the inner primary members having a zone extending from the top to the bottom thereof free of aluminum on the side toward the non-slotted thrust face, the bimetallic elements acting to bend the thrust faces toward cylindrical shape upon an increase of temperature, one of the thrust faces being formed with a vertical slot, the parts being so disposed that when upon cooling from an elevated temperature the pin bosses seize on the piston pin further cooling causes the bimetallic elements to move the parts on the skirt adjacent the slot outwardly on the thrust diameter thus keeping the thrust diameter at a close non-slapping fit in the cylinder bore.

8. A piston as claimed in claim 7 which has two modifying members of aluminum alloy, each of the modifying members extending from a pin boss to the slotted thrust face and projecting inwardly from the plane of the inner primary member of a bimetallic element toward the thrust diameter, and serving to reduce the bending action of the bimetallic element.

9. In a piston of the type formed of a light-weight piston material and having pin bosses, a steel piston pin passing through the pin bosses, opposite thrust faces separated from the head by horizontal slots, the outer surface of the skirt being at approximately 70° F. of oval shape with the minor axis of the oval coinciding with the axis of the piston pin bosses, a pair of bimetallic thermostatic elements extending chordally of the piston at right angles to the axis of the piston pin bosses and connected to the bosses, each thermostatic element comprising an inner primary plate member of material less expansible than the skirt material and an outer primary member of the skirt material, the outer primary member being narrower than the inner primary member, the inner primary member being formed with at least one opening; the improvement which comprises having one of the thrust faces formed with a vertical slot, and having at least two modifying members of the skirt material, each modifying member extending part way between a boss and a thrust face along the inner face of an inner primary member and passing through said opening in an inner primary member to join the outer primary member, the parts being so disposed that when upon cooling the pin bosses grip the piston pin further cooling causes the bimetallic elements to spread the slot, thus preventing an excessive decrease of the diameters adjacent the slot.

10. In a piston of the type formed of a lightweight piston material and having pin bosses, a steel piston pin passing through the pin bosses, opposite thrust faces separated from the head by horizontal slots, the outer surface of the skirt being at approximately 70° F. of oval shape with the minor axis of the oval coinciding with the axis of the piston pin bosses, a pair of bimetallic thermostatic elements extending chordally of the piston at right angles to the axis of the piston pin bosses and connected to the bosses, each thermostatic element comprising an inner primary plate member of material less expansible than the skirt material and an outer primary member of the skirt material, the outer primary member being narrower than the inner primary member, the inner primary member being formed with at least one opening; the improvement which comprises having one of the thrust faces formed with a vertical slot, having a pair of modifying members running from the pin bosses along the inner faces of the plates toward a thrust face, and a second pair of modifying members running from the pin boss toward, but terminating short of, the other thrust face and passing through openings in the plates to join the outer webs of the thermostatic elements, the parts being so disposed that when upon cooling the pin bosses grip the piston pin further cooling causes the bimetallic elements to spread the slot, thus preventing an excessive decrease of the skirt diameters adjacent the slot.

ADOLPH L. NELSON.